US009331930B1

(12) United States Patent
Ramasubramanian et al.

(10) Patent No.: US 9,331,930 B1
(45) Date of Patent: May 3, 2016

(54) SYSTEMS AND METHODS FOR FORWARDING NETWORK PACKETS IN A NETWORK USING NETWORK DOMAIN TOPOLOGY INFORMATION

(75) Inventors: Srinivasan Ramasubramanian, Redwood City, CA (US); Kanzhe Jiang, Los Altos Hills, CA (US); Robert Edward Adams, Sunnyvale, CA (US); Robert W. Sherwood, Palo Alto, CA (US); Subrata Banerjee, Los Altos, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 834 days.

(21) Appl. No.: 13/603,160

(22) Filed: Sep. 4, 2012

(51) Int. Cl.
*H04L 12/715* (2013.01)

(52) U.S. Cl.
CPC ..................................... *H04L 45/04* (2013.01)

(58) Field of Classification Search
CPC ........................................................ H04L 45/04
USPC ......................................................... 370/351
See application file for complete search history.

(56) References Cited

U.S. PATENT DOCUMENTS

| 2003/0229900 | A1* | 12/2003 | Reisman | ........... G06F 17/30873 725/87 |
| 2008/0247395 | A1* | 10/2008 | Hazard | .................... H04L 12/66 370/392 |
| 2010/0211664 | A1* | 8/2010 | Raza et al. | ......... H01R 13/6658 709/223 |
| 2013/0034104 | A1* | 2/2013 | Yedavalli et al. | ....... H04L 41/12 370/400 |
| 2013/0077630 | A1* | 3/2013 | Bejerano et al. | .............. 370/392 |
| 2013/0108263 | A1* | 5/2013 | Srinivas | ............... H04Q 3/0083 398/45 |

OTHER PUBLICATIONS

Pfaff et al., OpenFlow Switch Specification, Dec. 31, 2009, 42 pages.
McKeown et al., OpenFlow: Enabling Innovation in Campus Networks, Mar. 14, 2008, 6 pages.
Cisco Systems, Cisco Catalyst 6500 Architecture, 1992-2007, 28 pages.
Casado et al., "SANE: A Protection Architecture for Enterprise Networks," Usenix Security, Aug. 2006 (15 pages).
Casado et al., "Ethane: Taking Control of the Enterprise," Conference of Special Interest Group on Data Communication (SIGCOMM), Japan, Aug. 2007 (12 pages).

(Continued)

*Primary Examiner* — Marcus R Smith
*Assistant Examiner* — Syed S Ali
(74) *Attorney, Agent, or Firm* — Treyz Law Group, P.C.; Michael H. Lyons

(57) ABSTRACT

A controller may be used to control client switches in a network that includes non-client switches. The controller may form client domains from groups of client switches that are separated by intervening non-client domains formed from non-client switches. The controller may determine a network domain topology from the client domains and non-client domains. The controller may determine a spanning tree that interconnects the nodes of the network domain topology. The controller may control client switches of the client domains to allow only network traffic between the client domains and the non-client domains along the spanning tree. The controller may use the network domain topology to generate inter-domain forwarding maps. The inter-domain forwarding maps may be used to determine network forwarding paths between end hosts in the network.

20 Claims, 22 Drawing Sheets

(56) References Cited

OTHER PUBLICATIONS

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.

Swierk et al., U.S. Appl. No. 13/088,262, filed Apr. 15, 2011.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

| DESTINATION DOMAIN | SOURCE LOCATION | OUTGOING SWITCH, PORT |
|---|---|---|
| BD2 | BD1<br>SW3<br>SW4<br>SW10 | SW4, P3<br>SW3, P3<br>SW4, P3<br>SW4, P3 |
| BD1 | BD2<br>SW3<br>SW4<br>SW10 | SW4, P2<br>SW3, P2<br>SW4, P2<br>SW4, P2 |

← 142

← 144

INTER-DOMAIN FORWARDING MAP

FIG. 13

NETWORK PACKET

| SOURCE IP ADDRESS | DESTINATION IP ADDRESS | SOURCE ETHERNET ADDRESS | DESTINATION ETHERNET ADDRESS | VLAN | ... | DATA |

FIG. 15

PACKET IN MESSAGE

| SWITCH ID | SOURCE PORT | MESSAGE IDENTIFIER (E.G., "PACKET IN") | PAYLOAD (E.G., ENTIRE RECEIVED NETWORK PACKET) |

FIG. 16

SYSTEMS AND METHODS FOR FORWARDING NETWORK PACKETS IN A NETWORK USING NETWORK DOMAIN TOPOLOGY INFORMATION

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

A network may include switches having controller clients that are controlled by a controller (client switches) and non-client switches that are not controlled by the controller. Some of the non-client switches may be interposed between client switches. The controller may direct the client switches to forward network packets along network forwarding paths through the network. It may be difficult for the controller for the controller to determine appropriate network forwarding paths in networks that include non-client switches. For example, a group of intervening non-client switches may separate groups of client switches. In this scenario, the group of non-client switches may be connected to groups of client switches at multiple network locations, potentially resulting in forwarding loops between the client switches and non-client switches.

SUMMARY

A controller such as a centralized controller server or a distributed controller may be used to control client switches in a network. The network may include non-client switches that are not controlled by the controller. The network may include end hosts that are coupled to the switches (e.g., the client and the non-client switches) at switch ports. The end hosts may send network packets that are forwarded through the network by the switches.

The controller may form client domains from groups (clusters) of client switches that are separated by intervening non-client domains formed from non-client switches. The controller may determine a network domain topology from the client domains and non-client domains. The network domain topology may include nodes that represent client and non-client domains. The nodes of the network domain topology may be connected based on corresponding network connections between switches of the client and non-client domains.

The controller may generate a spanning tree that interconnects the nodes of the network domain topology. The controller may control client switches of the client domains to allow only network traffic between the client domains and the non-client domains along the spanning tree (e.g., by routing outgoing traffic along the spanning tree and ignoring incoming traffic on links that do not traverse the spanning tree).

The controller may use the spanning tree of the network domain topology to determine network forwarding paths between end hosts in the network. The controller may generate an inter-domain forwarding map for each client domain based on the spanning tree. Each inter-domain forwarding map may identify which port and which client switch of the corresponding client domain should be used to forward network packets from a given source network location (e.g., a neighboring domain or an end host within the corresponding client domain) to a neighboring domain (e.g., a client or non-client domain that is connected to the corresponding client domain in the spanning tree).

Each inter-domain forwarding map may be determined based on intra-domain forwarding paths generated by the controller. The intra-domain forwarding paths may represent forwarding paths throughout corresponding client domains. For example, the intra-domain forwarding paths may include client domain exit paths from client switches in a corresponding client domain to neighboring domains.

The controller may use the inter-domain forwarding map to determine network forwarding paths between end hosts. The controller may receive a network packet from an end host (e.g., a network packet forwarded to the controller from the end host by a client switch). The controller may identify source and destination end host information from the received network packet and host attachment point information maintained by the controller. The controller may identify a source and destination domain based on the source and destination end host information. The controller may subsequently use the spanning tree of the network domain topology to determine an inter-domain domain forwarding path from the source domain to the destination domain. Intra-domain forwarding paths may be used to determine forwarding paths within each client domain of the inter-domain forwarding path.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 13 is an illustrative inter-domain forwarding map that may be generated by a controller in accordance with an embodiment of the present invention.

FIG. 15 is an illustrative network packet that may be received by a controller from end hosts in accordance with an embodiment of the present invention.

FIG. 16 is an illustrative packet in message including a network packet that may be received by a controller from client switches in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
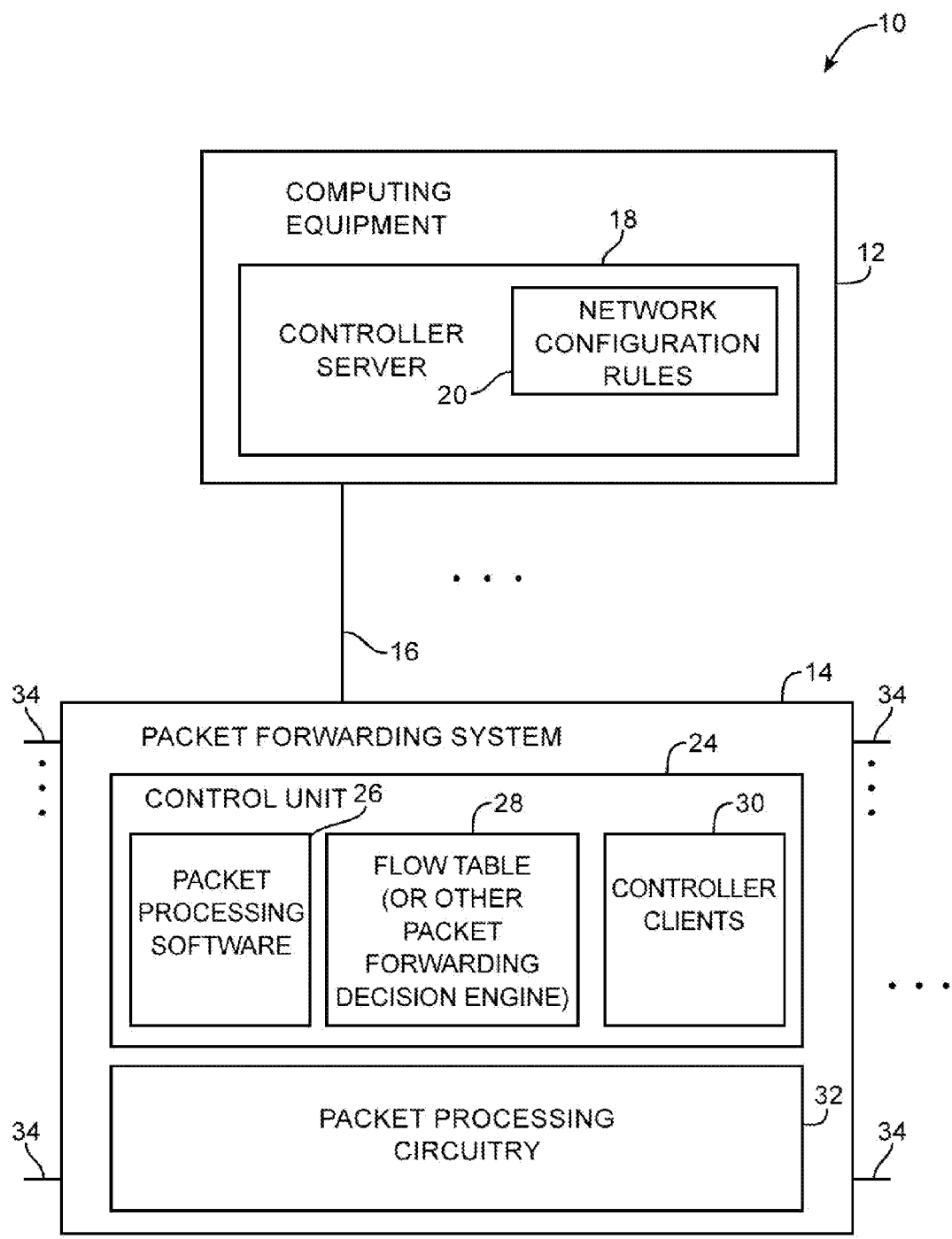
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
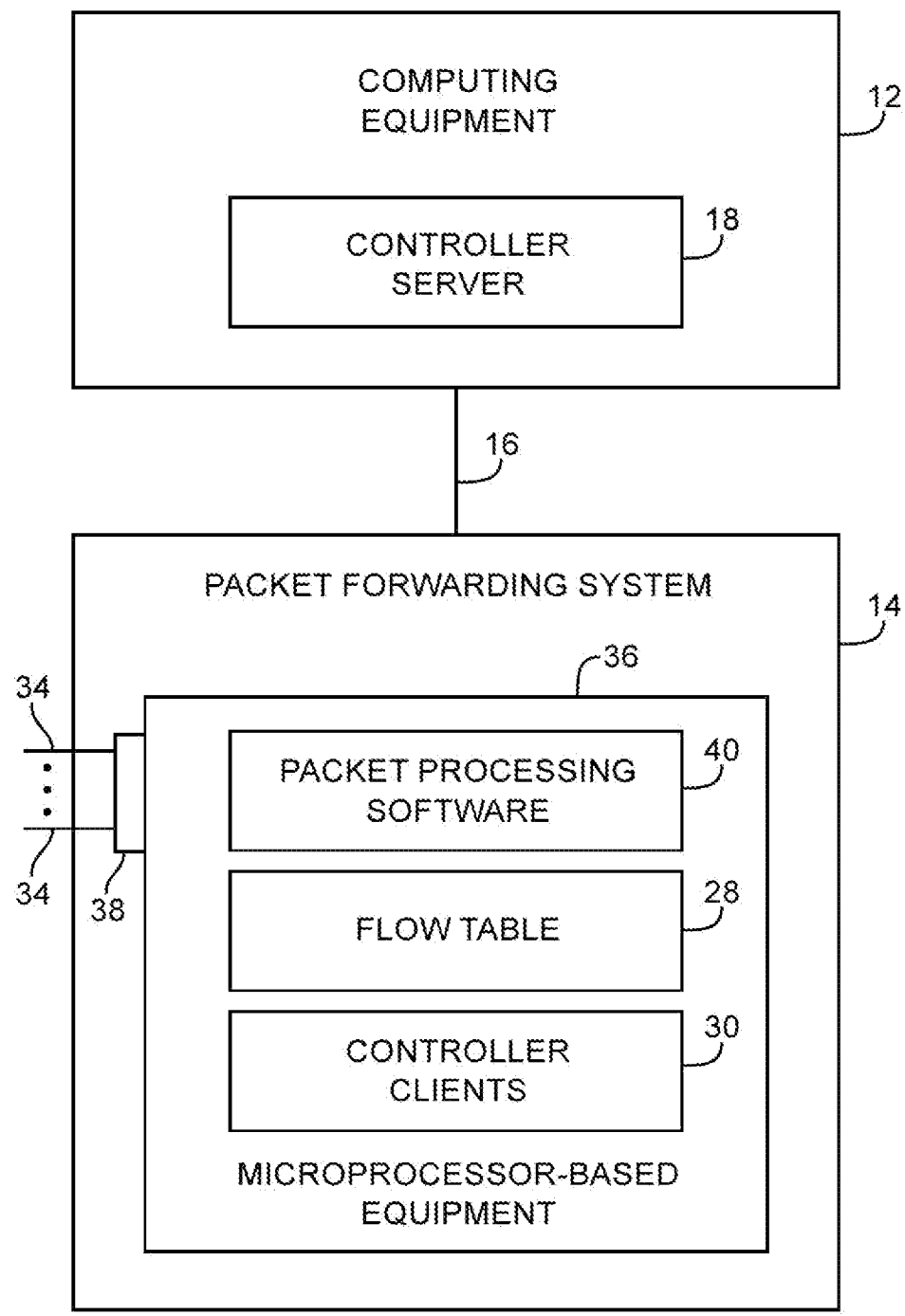
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
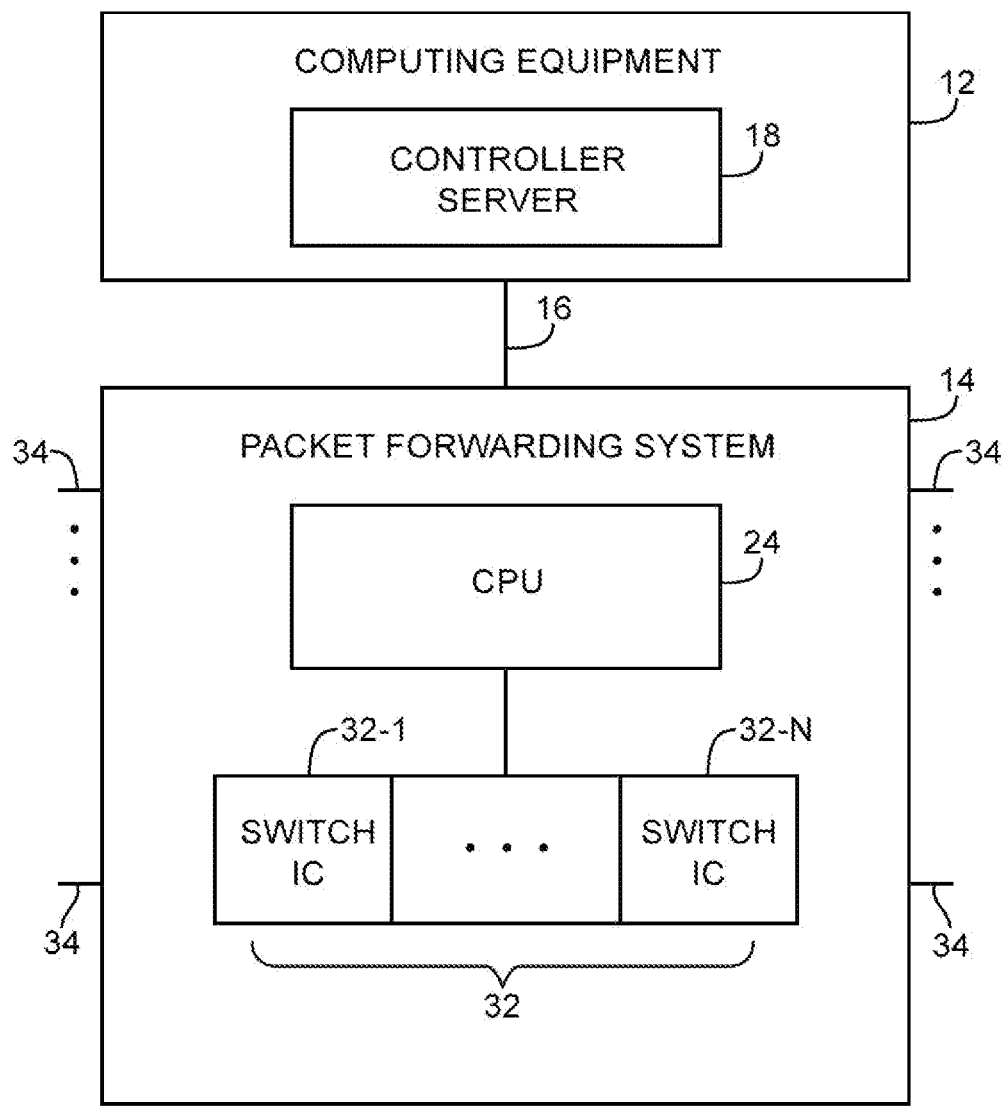
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
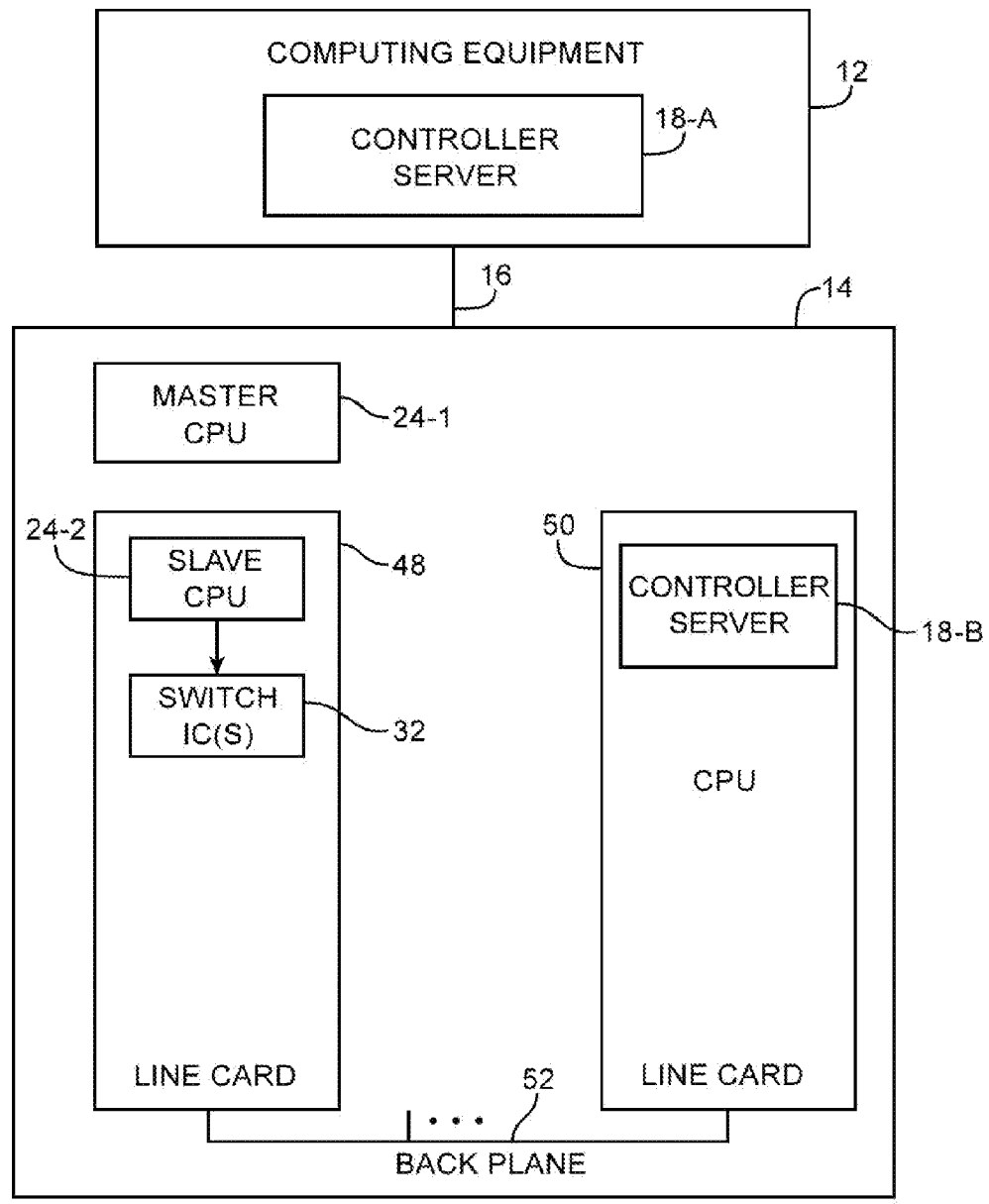
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
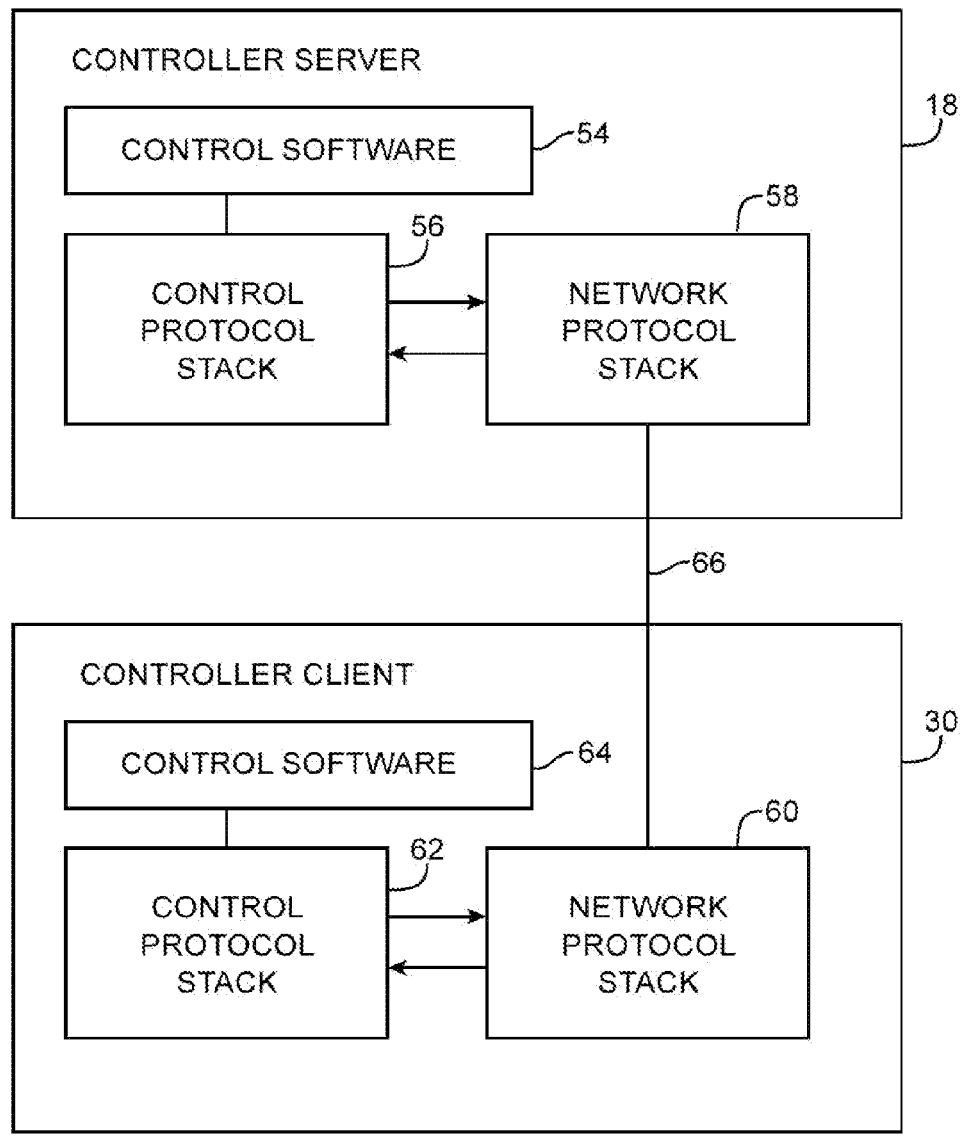
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
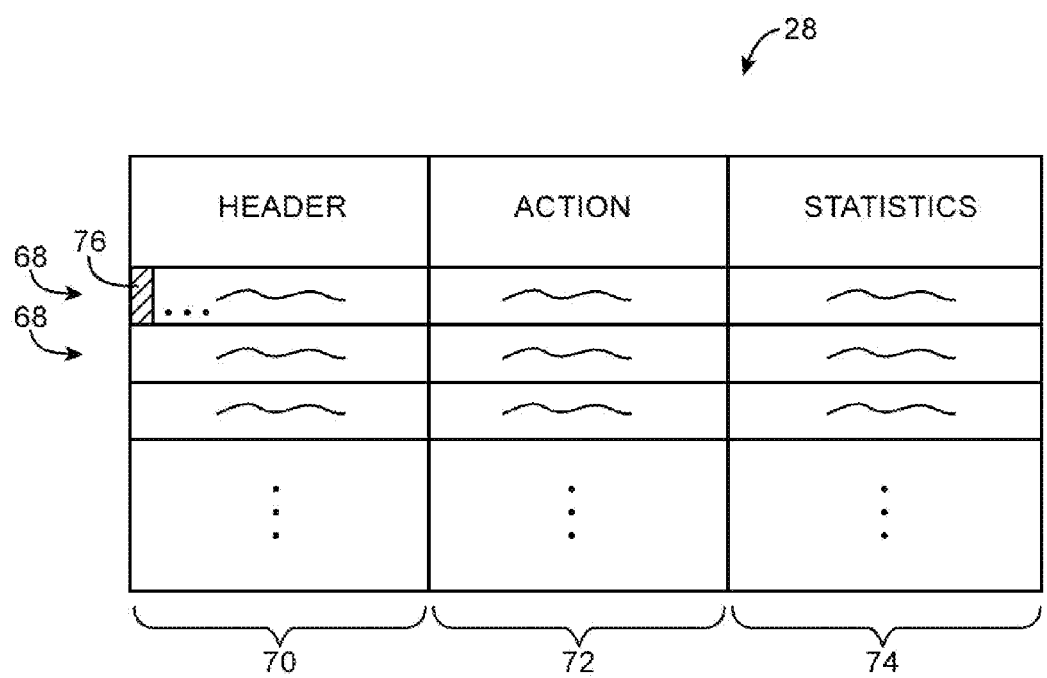
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
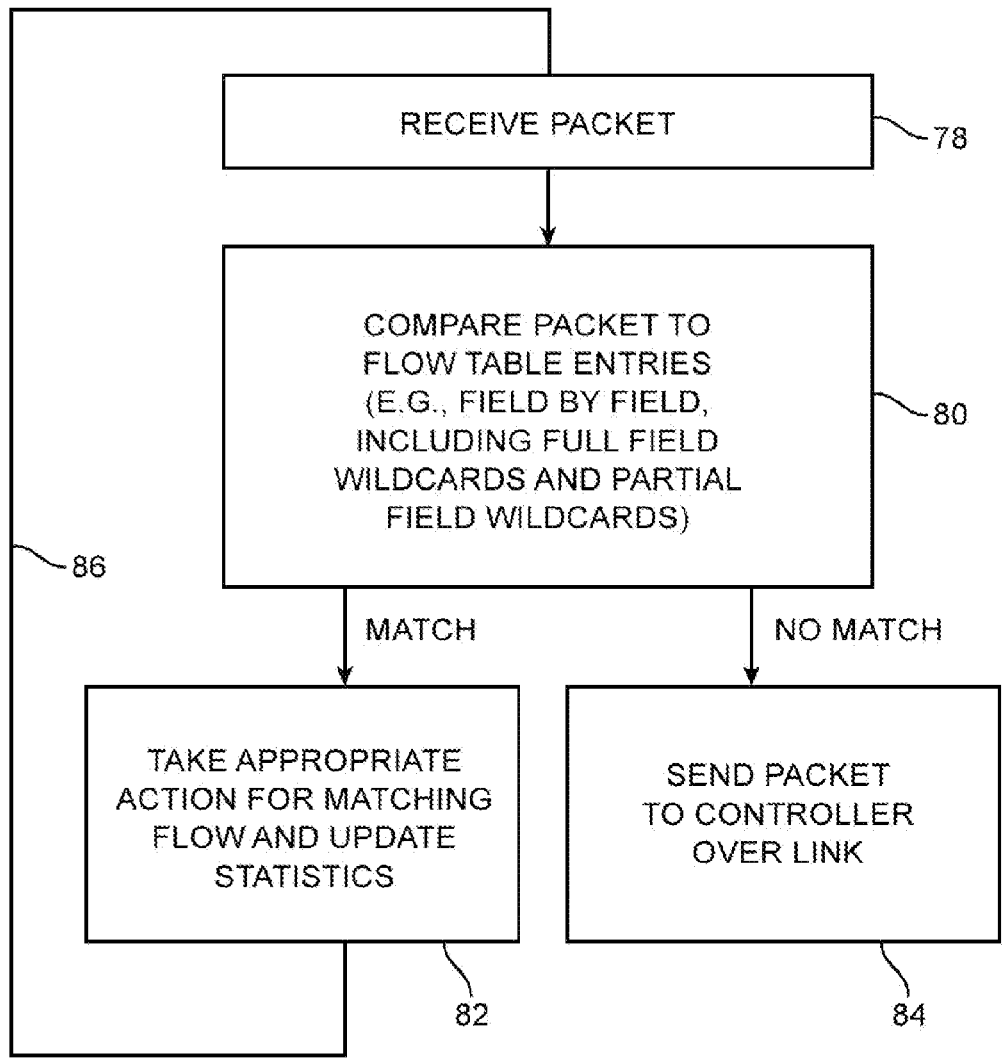
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

A controller (e.g., a controller server or other controllers implemented on computing equipment) may be used to control switches in a network. The controller may include one or more controller servers or may be distributed throughout one or more of the switches (e.g., portions of the controller may be implemented on storage and processing circuitry of multiple switches). An illustrative network 100 that includes a controller 18 is shown in FIG. 8.

Figure 8:
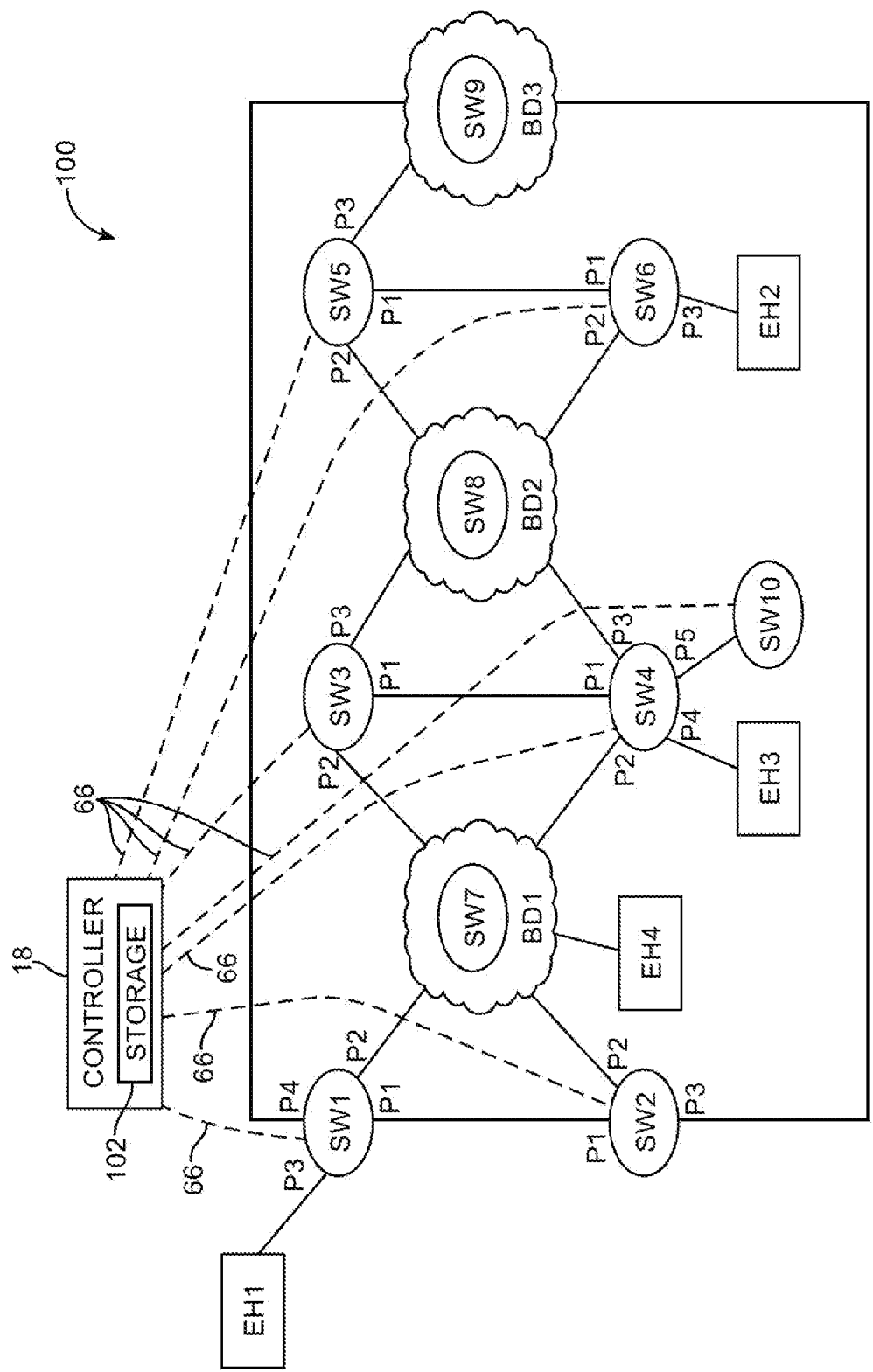
FIG. 8 is a diagram of an illustrative network that includes client switches that are controlled by a controller and non-client switches that do not communicate with the controller in accordance with an embodiment of the present invention.

As shown in FIG. 8, network 100 may include switches that communicate with controller 18 via control paths 66. For example, network 100 includes switches SW1, SW2, SW3, SW4, SW5, and SW6 that are controlled by controller 18. Switches that are controlled by controller 18 may include controller clients that communicate with controller 18 and may sometimes be referred to as client switches. Control paths 66 may include additional switches or other network elements that forward network control packets between controller 18 and the client switches.

Switches in network 100 that do not communicate with controller 18 via control paths 66 (e.g., because the switches do not include controller clients) may be referred to as non-client switches. In some scenarios, client switches in network 100 may be separated by intervening non-client switches. For example, client switch SW1 may be separated from client switch SW3 by intervening non-client switch SW7 and client switch SW4 may be separated from client switch SW5 by non-client switch SW8.

Switches in network 100 may have ports that are coupled to network devices (elements) such as other switches, end hosts, or other desired network devices. For example, switch SW1 may include ports P1, P2, P3, and P4, switch SW2 may include ports P1, P2, and P3, etc. Port P1 of switch SW1 may be coupled to port P1 of switch SW2. Ports P2 and P4 of switch SW1 may be coupled to non-client switches (e.g., non-client switches SW7 and SW9). Port P3 of switch SW1 may be coupled to end host EH1.

It may be difficult for controller 18 to determine network topologies associated with non-client switches, (e.g., because the non-client switches do not communicate with controller 18 via paths 66). Groups of non-client switches may form non-client domains (clusters). The non-client domains may, for example, form broadcast domains. Non-client switches of a given broadcast domain may respond to receipt of a broadcast network packet (e.g., network packets that have been marked as broadcast packets) by flooding that broadcast domain with the broadcast network packet. In some scenarios, such packet flooding may cause inefficient network operations. For example, a network loop may be forward from client switch SW1, broadcast domain BD1, and client switch SW2. In this scenario, broadcast network packets sent from client switch SW1 to broadcast domain BD1 via port P2 may be flooded by non-client switches such as switch SW7 of broadcast domain BD1 and may be received at port P2 client switch SW2 and potentially returned to client switch SW1 at port P1 of client switch SW1.

Figure 9A:
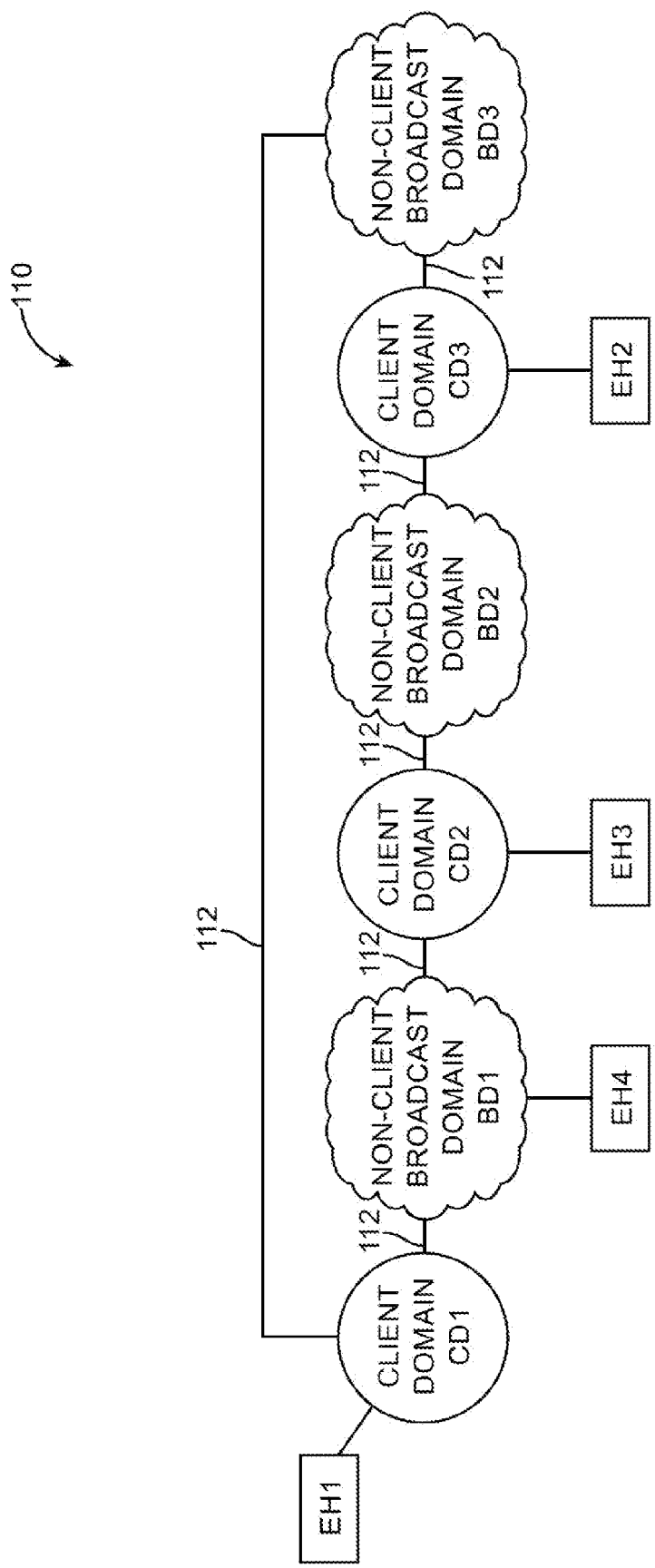
FIG. 9A is a diagram showing how the network of FIG. 8 may be organized into client and non-client domains that form a network domain topology in accordance with an embodiment of the present invention.

Controller 18 may maintain information that describes the topology of network 100. For example, controller 18 may communicate with client switches using packets such as link layer discover protocol (LLDP) packets to identify network connections between client switches in network 100. The network topology information may be maintained in storage 102 at controller 18 or at remote storage equipment (not shown). The network topology information may include network domain topology information describing domains (e.g., groups of switches) and network connections between the domains. FIG. 9A is an illustrative diagram of a network domain topology '110 describing network 100 (FIG. 8) that may be maintained by controller 18. Network domain topology 110 may sometimes be described as a higher-level network topology.

As shown in FIG. 9A, controller 18 may identify client domains (clusters) and non-client broadcast domains. The client domains may be formed from groups of interconnected client switches, whereas the non-client broadcast domains may be formed from groups of non-client switches. For example, client domain CD1 may include client switches SW1 and SW2 that are coupled via network paths that are controlled by controller 18. As another example, non-client broadcast domain BD2 may include non-client switch SW8.

Network domains in the network domain topology may be coupled by network connections 112 that each include a set of network paths between a given pair of network domains. For example, network connections 112 between client domain CD1 and non-client broadcast domain BD1 may include network paths between port P2 of switch SW1 and domain BD1 and network paths between port P2 of switch SW2 and domain BD1.

Figure 9B:
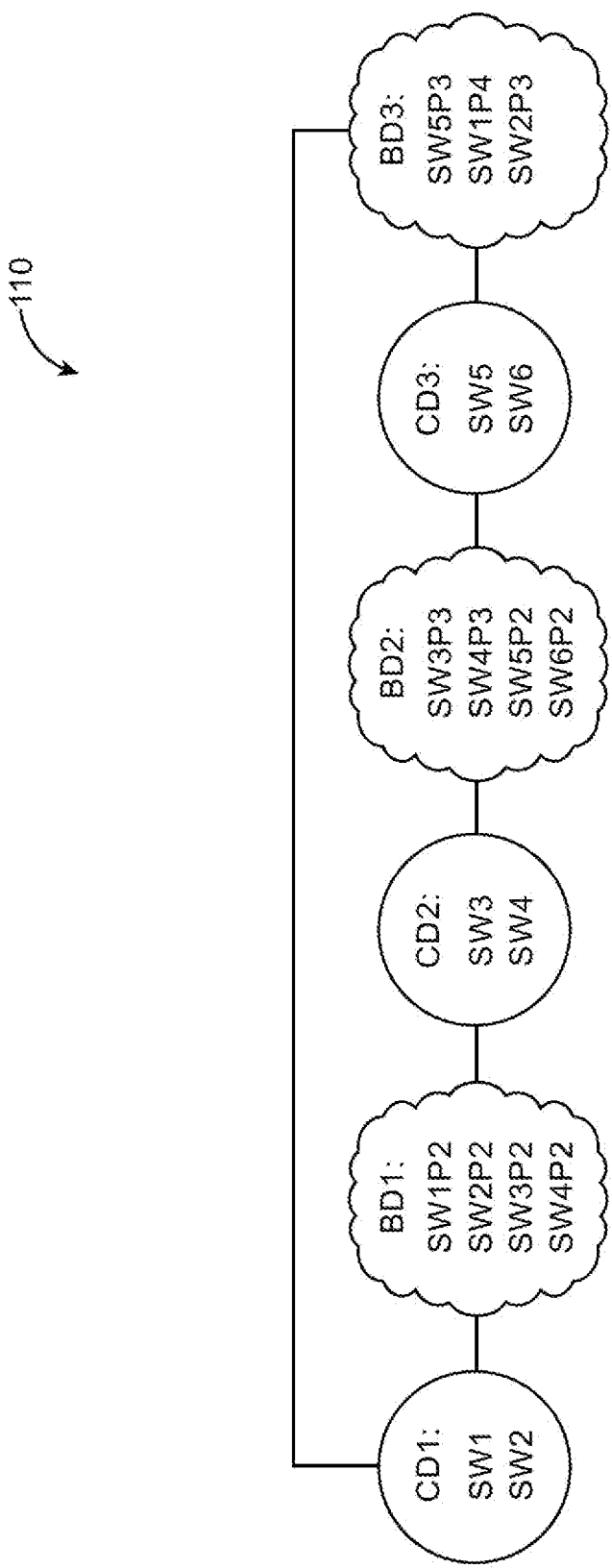
FIG. 9B is a diagram of network domain information that may be stored by a controller in accordance with an embodiment of the present invention.

Controller 18 may identify network domains using client switches and ports of the client switches. FIG. 9B is an illustrative diagram of network domain topology 110 in which client domains are represented by groups of client switches and non-client domains (e.g., broadcast domains) are represented by ports of the client switches that are coupled to the non-client domains. For example, client domain CD1 may be represented by client switches SW1 and SW2, whereas broadcast domain BD1 may be represented by port P2 of client switch SW1, port P2 of client switch SW2, port P2 of client switch SW3, and port P2 of client switch SW4. Network domain topology 110 of FIG. 9B may be maintained by controller 18 using lists, databases, tables, or any other desired data structures (e.g., maintained at storage 102). For example, an entry in a database that corresponds to client domain CD2 may identify client switches SW3 and SW4.

Figure 10:
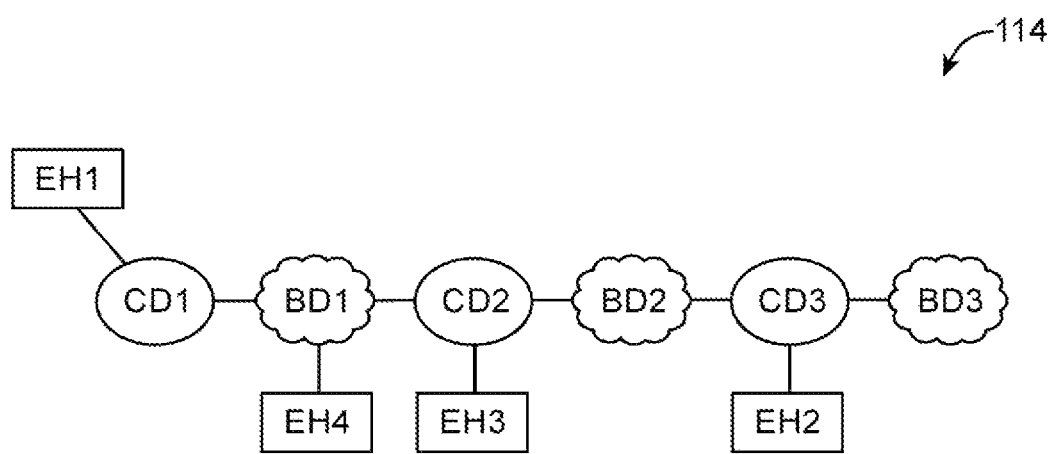
FIG. 10 is a diagram of an illustrative spanning tree formed from a network domain topology in accordance with an embodiment of the present invention.

Controller 18 may process network topology information (e.g., information stored in storage 102) to form a spanning tree that links the network domains of network domain topology 110. FIG. 10 is a diagram of an illustrative spanning tree 112 formed from network domain topology 110 of FIG. 9A. Spanning tree 114 may be formed from network paths that link each domain of topology 110 without forming loops in the network path. The network path may be determined using algorithms such as breadth-first search, depth-first search, or any other desired algorithms for determining a spanning tree from nodes (e.g., domains) and links (e.g., network connections between domains). In the example of FIG. 10, network path 112 between client domain CD1 and non-client broadcast domain BD3 has been removed to form spanning tree 114 (e.g., removed by controller 18). Spanning tree 114 may be used by controller 18 to determine network forwarding paths between domains or between end hosts.

As an example, end host EH1 may be associated with client domain CD1 (e.g., because end host EH1 is coupled to client switch SW1 of client domain CD1) and end host EH2 may be associated with client domain CD3. In this scenario, controller 18 may use spanning tree 112 to determine a forwarding path from end host EH1 to end host EH2 through network domains. The forwarding path may include domains CD1, BD1, CD2, BD2, and CD3.

The example of FIG. 10 in which spanning tree 112 is formed by removing the network link (connection) between domains CD1 and BD3 is merely illustrative. If desired, any suitable network link may be removed to produce spanning tree 112. For example, the network link between domains CD1 and BD1 or between domains CD2 and BD1 may be removed to form a spanning tree 112 that does not include forwarding loops. In some scenarios, multiple network links may be removed (e.g., when multiple forwarding loops exist in a network domain topology).

Controller 18 may control client switches of client domains of spanning tree 112 to implement spanning tree 112. For example, controller 18 may provide flow table entries to client switches of client domain CD1 to block traffic between client domain CD1 and broadcast domain BD3. In one scenario, controller 18 may provide a first flow table entry to client switch SW1 that directs client switch SW1 to drop network packets received at port P4 of client switch SW1 from broadcast domain BD3. Controller 18 may provide a second flow table entry to client switch SW2 that directs client switch SW2 to drop network packets that are received at port P3 of client switch SW2.

Figure 11:
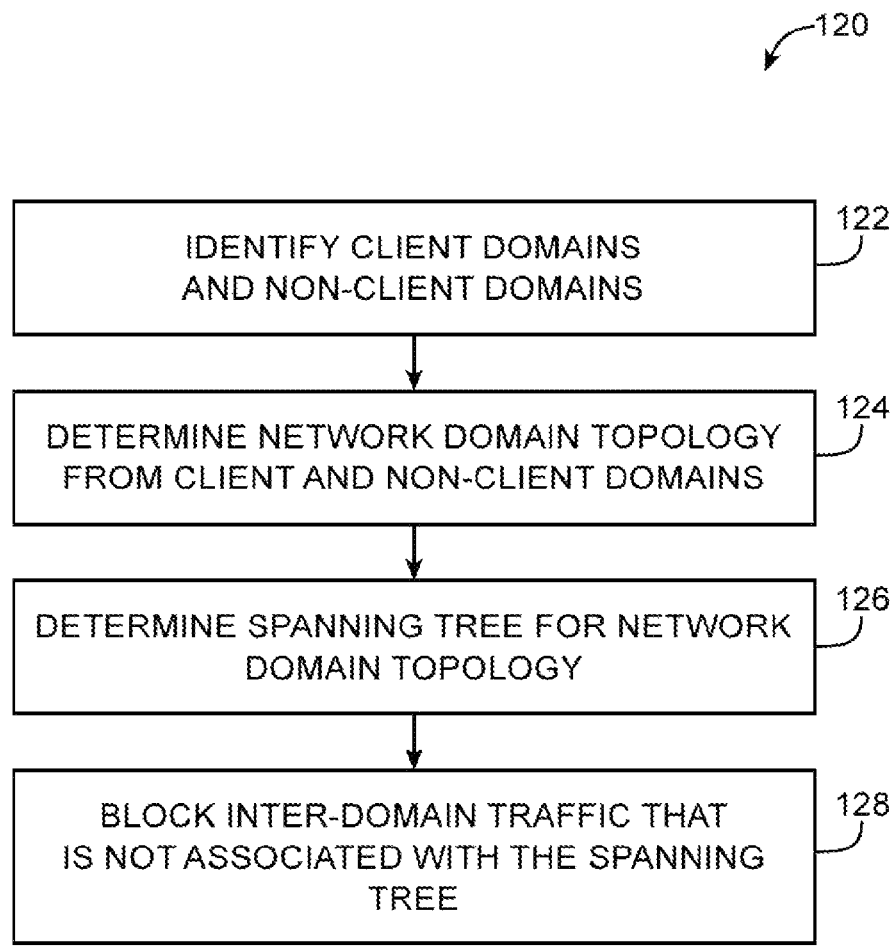
FIG. 11 is a flow chart of illustrative steps that may be performed to determine a spanning tree from a network and to control network traffic based on the spanning tree in accordance with an embodiment of the present invention.

FIG. 11 is a flow chart 120 of illustrative steps that may be performed by controller 18 to configure client switches of a network to form a spanning tree for inter-domain forwarding (e.g., an inter-domain spanning tree for forwarding network packets between domains of the network).

During the operations of step 122, controller 18 may identify client domains and non-client domains (e.g., non-client broadcast domains). For example, controller 18 may communicate with the client switches to determine which client switches are interconnected to form client domains and which client domains are separated by non-client broadcast domains.

During step 124, controller 18 may identify the network domain topology based on the identified client and non-client domains. The network domain topology may include information describing network connections between client domains and non-client domains. As an example, network domain topology 110 (FIG. 9A) may be identified based on network 100 of FIG. 8.

During step 126, controller 18 may determine a spanning tree for the network domain topology. For example, the controller may determine a spanning tree 112 (FIG. 10) by removing loops in the network domain topology.

During step 128, controller 18 may block inter-domain traffic that is not associated with the spanning tree. For example, the controller may remove network paths that do not form part of the spanning tree. Inter-domain traffic may be blocked by providing flow table entries that direct client switches to drop network packets that are not associated with the spanning tree (e.g., network packets that do not traverse links of the spanning tree). If desired, flow table entries may be provided to client switches that only allow inter-domain traffic at ports associated with the spanning tree.

Figure 12A:
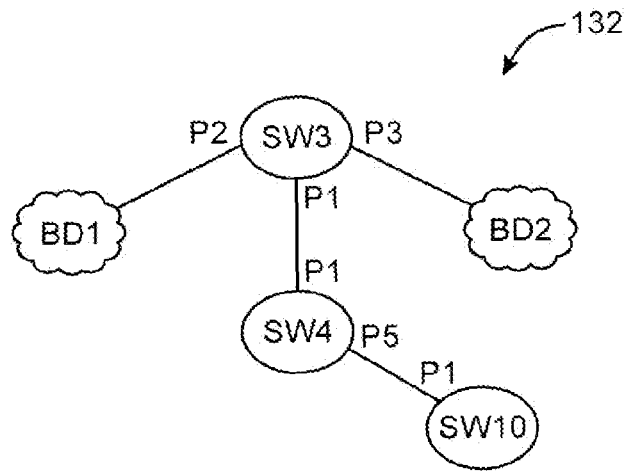
FIGS. 12A-12C are diagrams of illustrative intra-domain forwarding paths that may be determined by a controller in accordance with an embodiment of the present invention.
Figure 12B:
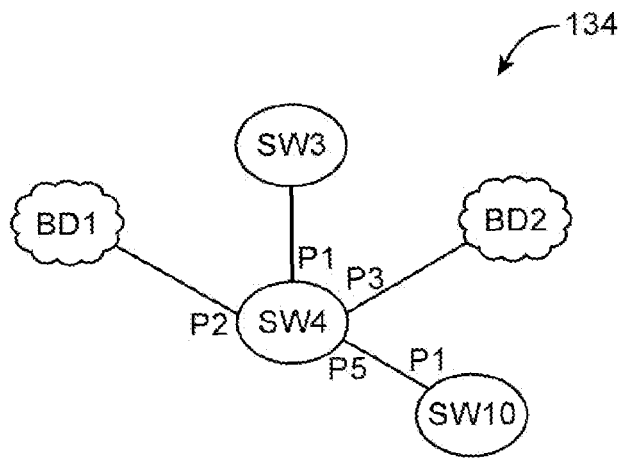
Figure 12C:
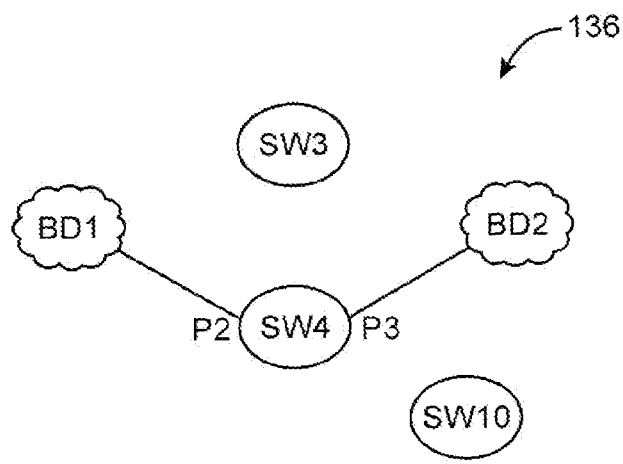

Controller 18 may determine and maintain intra-domain forwarding information that identifies forwarding paths within each client domain. Intra-domain forwarding paths may be determined for each switch and each neighboring domain associated with a given client domain. FIGS. 12A, 12B, and 12C are illustrative diagrams showing how controller 18 may determine intra-domain forwarding paths for client domain CD2 (FIG. 9A).

As shown in FIG. 12A, controller 18 may determine intra-domain forwarding paths 132 originating from client switch SW3 of client domain CD2. Intra-domain forwarding paths 132 may be determined by calculating the shortest paths within client domain CD2 between client switch SW3 and other client switches of client domain CD2. Intra-domain forwarding paths 132 may include client domain exit paths from client switch SW3 to neighboring domains such as non-client broadcast domains. Controller 18 may determine shortest paths within client domain CD2 using any desired algorithms. For example, controller 18 may use the Dijkstra's shortest path algorithm, the Floyd-Warshall algorithm, the Bellman-Ford algorithm, or any other desired algorithms for determining a path between two nodes in a graph (e.g., a network topology graph that represents a network topology).

For client domain CD2, controller 18 may identify a first network path between client switches SW3 and SW4 from port P1 of SW3 to port P1 of SW4. A second network path may be identified from client switch SW3 to non-client domain BD2 via port P3 of client switch SW3 (e.g., a client domain exit path). A third network path may be identified from client switch SW3 to non-client domain BD1 via port P2 of client switch SW3. A fourth network path may be identified from client switch SW3 to client switch SW10 through client switch SW4. Controller 18 may similarly determine intra-domain forwarding paths 134 originating from client switch SW4 of client domain CD2 as shown in FIG. 12B (e.g., forwarding paths may be determined from client switch SW4 to client switch SW3, client switch SW10, non-client domain BD1, and non-client domain BD2). Intra-domain forwarding paths may similarly be generated for client switch SW10 and may correspond to the forwarding path structure of FIG. 12B.

As shown in FIG. 12C, controller 18 may also determine intra-domain forwarding paths 132 between non-client domains associated with client domain CD2. In the example of FIG. 12C, controller 18 may determine (e.g., using shortest-path algorithms) a forwarding path between non-client broadcast domains BD1 and BD2 that traverses ports P2 and P3 of client switch SW4.

Forwarding paths such as forwarding paths 132, 134, and 136 that are determined for each switch of a client domain may be used to assign a network port of the client domain to traffic for each neighboring domain (e.g., non-client broadcast domains that are coupled to the client domain). The network ports that are assigned to each non-client broadcast domain for a given client domain may be stored in an inter-domain forwarding map 142 as shown in FIG. 13. In the example of FIG. 13, map 142 describes switch and port assignments for client domain CD2.

Inter-domain forwarding map 142 may include entries that identify which outgoing switch and port is assigned to traffic from source locations to external broadcast domains. Map 142 may be stored as a table, database, or other forms of storage (e.g., in storage 102 of controller 18). Each entry may include a destination broadcast domain, a source location such as a neighboring domain or a client switch within client domain CD2, and an outgoing switch and port that is assigned to traffic from the source location to the destination broadcast domain.

As an example, entry 144 may assign port P3 of client switch SW4 to traffic from source non-client broadcast domain BD1 to destination non-client broadcast domain BD2. In this scenario, controller 18 may direct network traffic destined for broadcast domain BD2 that is received by client domain CD2 from broadcast domain BD1 to port P3 of switch SW4 (e.g., network traffic from domain BD2 to domain BD1 that traverses domain CD2 may be routed to domain BD1 through port P3 of switch SW4. By routing all traffic from domain BD2 to domain BD1 through a single peripheral port of client domain CD2, controller 18 may help non-client switches such as switch SW7 of domain BD1 learn to associate network devices of broadcast domain BD2 with port P2 of switch SW3 (e.g., even though physical network paths exist between broadcast domain BD1 and BD2 through client switch SW4).

Controller 18 may use inter-domain forwarding map 142 to help control how non-client switches in broadcast domains forward packets to client domains. Controller 18 may use entries such as entries 144 and 146 to determine which switch and port is allowed to receive network traffic from a broadcast domain to a given network location. The allowed switch and port may be selected by controller 18 to correspond with the assigned outgoing switch port in the reverse traffic direction.

As an example, entry 146 identifies that network packets received from broadcast domain BD2 should be forwarded to destination broadcast domain BD1 through port P2 of switch SW4 (e.g., a client domain exit port). In this scenario, network packets received from broadcast domain BD1 that are destined for broadcast domain BD2 may only be allowed at port P2 of switch SW4 (e.g., a client domain entry port corresponding to network traffic in the reverse direction as network traffic assigned to the client domain exit port). In other words, controller 18 may only allow network packets from a source network location to a destination network location to enter client domain CD2 at a switch and port that has been assigned as a client domain exit port for network packets sent in a reverse network traffic direction (e.g., network packets sent from the destination network location to the source network location). Appropriate flow table entries may be provided to client switches in client domain CD2 to ensure that network packets are allowed to enter client domain CD2 only at allowed switches and ports.

Figure 14:
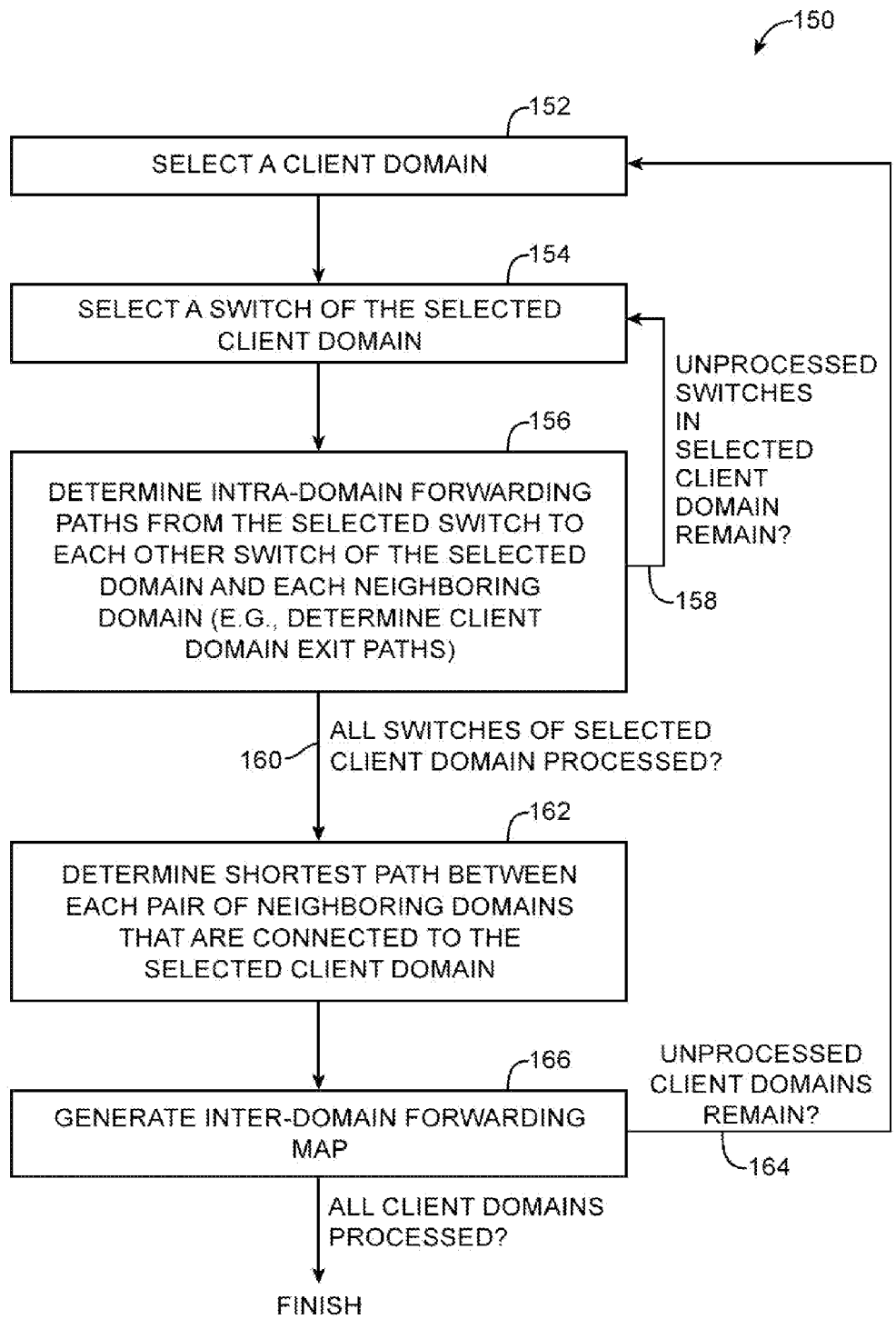
FIG. 14 is a flow chart of illustrative steps that may be performed to generate an inter-domain forwarding map for a network domain topology in accordance with an embodiment of the present invention.

The entries of inter-domain forwarding map 142 may be determined from network domain topology information (e.g., spanning tree 112 of FIG. 10) and forwarding paths such as paths 132, 134, and 136 that are generated by controller 18. FIG. 14 is a flow chart of illustrative steps that may be performed by controller 18 to generate inter-domain forwarding maps such as map 142 for each client domain of a network.

During the operations of step 152, controller 18 may select a client domain. The client domain may be selected from network domain topology information such as network domain topology information 110 of FIG. 9B or topology information 112 of FIG. 10. As an example, client domains CD1, CD2, or CD3 of FIG. 9B may be selected for network 100 of FIG. 8.

During step 154, controller 18 may select a switch of the selected client domain. Controller 18 may subsequently determine intra-domain forwarding paths from the selected switch to each other switch and each neighboring domain that is connected to the selected client domain during step 156. For example, controller 18 may generate intra-domain forwarding paths 134 (FIG. 12A) for switch SW3 or intra-domain forwarding paths 134 (FIG. 12B) for switch SW4. The intra-domain forwarding paths may include client domain exit paths.

If unprocessed switches remain in the selected client domain, the process may return to step 154 via path 158 to select one of the remaining switches for processing. If all switches of the selected client domain have been processed (e.g., during steps 154 and 156), controller 18 may perform the operations of step 162.

During step 162, controller 18 may determine the shortest path between each pair of neighboring domains that are connected to the selected client domain (e.g., the client domain selected during step 152). As an example, controller 18 may identify forwarding paths 136 of FIG. 12C that couple neighboring non-client broadcast domains BD1 and BD2.

During step 166, controller 18 may generate an inter-domain forwarding map such as map 142 for the selected client domain using the forwarding paths identified during steps 156 and 162.

Consider the scenario in which client domain CD2 has been selected during step 154. In this scenario, forwarding paths 136 (FIG. 12C) may be used to determine that network packets sent from broadcast domain BD1 to BD2 should exit client domain CD2 at port P3 of switch SW4. A corresponding entry in the inter-domain forwarding map such as entry 144 of map 142 (FIG. 13) may be generated. Similarly, forwarding paths 136 may be used to determine that network packets sent from broadcast domain BD2 to BD1 should exit client domain CD2 at port P2 of switch SW4. Controller 18 may use forwarding paths 134 to determine that network packets sent from switch SW4 to broadcast domain BD1 should be forwarded from port P2 of switch SW4, whereas forwarding paths 132 may be used to determine that network packets sent from switch SW3 to broadcast domain BD1 should be sent from port P2 of switch SW3.

If unprocessed client domains remain at the completion of step 166 (e.g., client domains that have not been selected during step 152 and processed during steps 154-166), the process may return to step 152 via path 164 to process remaining client domains. If all of the client domains that are controlled by controller 18 have been processed to generate respective inter-domain forwarding maps, the process of flowchart 150 may be complete.

Network topology information and forwarding maps may be used by controller 18 to route network packets between end hosts in a network such as network 100 (FIG. 1) that includes client switches and non-client switches. FIG. 15 is an illustrative diagram of a network packet that may be sent from a source end host to a destination end host. As shown in FIG. 15, network packet 172 may include a source internet protocol (IP) address, a destination IP address, a source Ethernet address, a destination Ethernet address, and a virtual local area network (VLAN) identifier stored in header fields of network packet 172. Network packet 172 may include data to be forwarded from the source end host to the destination end host through the network.

The source IP address and source Ethernet address of network packet 172 may correspond to addresses associated with the source end host, whereas the destination IP address and destination Ethernet address may correspond to addresses associated with the destination end host. The VLAN identifier may identify a virtual local area network that is associated with the source end host. If desired, network packet 172 may include any desired combination of the network attributes (e.g., information stored in network packet header fields) shown in FIG. 15 or may include additional header fields associated with network protocols (e.g., IP header fields, Ethernet header fields, etc.).

Network switches may forward network packets such as packet 172 based on network attributes stored in the header fields of network packet 112. For example, client switches may be provided with flow table entries via control paths 66 that direct the client switches to identify network packets that are destined for an end host based on destination IP and Ethernet addresses of the network packets. In this scenario, the flow table entries may direct the client switches to forward the identified network packets to the end host through predetermined forwarding paths (e.g., network paths that have been determined by controller 18 using network topology information or other desired information).

If an appropriate flow table entry does not exist for a network packet received at a client switch (e.g., if header fields of the network packet do not match any flow table entries that have been provided to the client switch by controller 18), the client switch may forward the network packet to the controller server along with additional information that is available to the client switch. FIG. 16 is an illustrative packet in message 174 that may be sent by switches to forward a network packet to controller 18.

As shown in FIG. 16, packet in message 174 may include a switch ID, a source port, a message identifier, and a payload. The switch ID may identify the switch that is sending the packet in message. The source port may identify the switch port at which the network packet was received. The message identifier may identify the type of message (e.g., a packet in message). The payload may include the entire network packet that is being forwarded to controller 18 (e.g., a network packet received from an end host. If desired, the payload may include a portion of the network packet instead of the entire network packet. The switch ID and source port may sometimes be referred to as an attachment point of the source end host (e.g., the location in the network to which the source end host is coupled).

Figure 17:
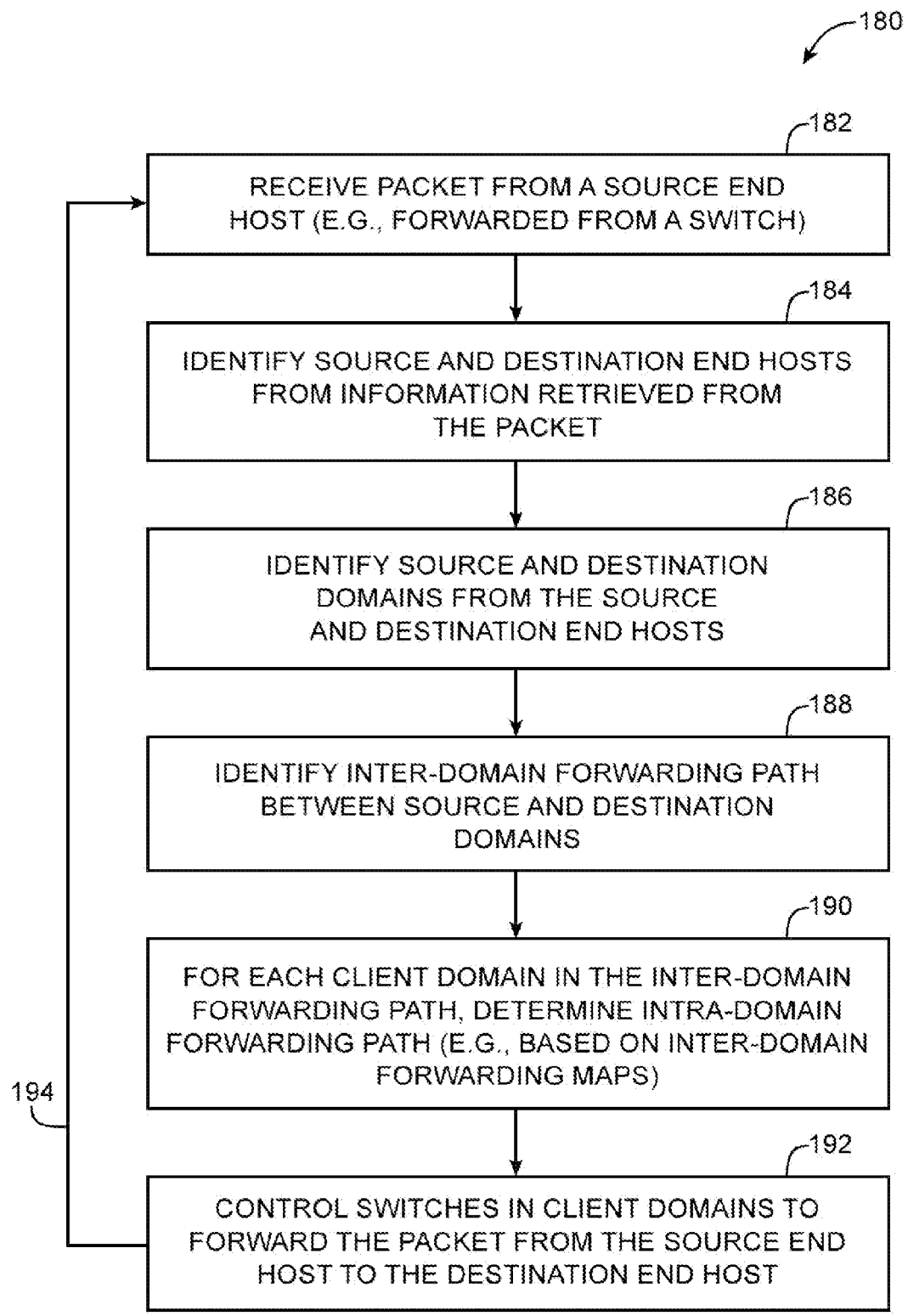
FIG. 17 is a flow chart of illustrative steps that may be performed to control switches to forward a network packet based on network domain topology information in accordance with an embodiment of the present invention.

Controller 18 may control client switches in a network having client and non-client switches to forward network packets through the network. FIG. 17 is an flow chart 180 of illustrative steps that may be performed by controller 18 to forward network packets through a network such as network 100 (FIG. 8).

During the operations of step 182, controller 18 may receive a packet from a source end host. The packet may be received as part of a packet in message that is sent from a client switch to controller 18 in response to receiving the network packet from the source end host.

During step 184, controller 18 may identify source and destination end hosts from information retrieved from the packet. For example, controller 18 may identify the source end host based on source IP and Ethernet address fields of the network packet. As another example, controller 18 may identify the destination end host based on destination IP and Ethernet address fields of the network packet. If desired, controller 18 may identify end hosts based on additional information provided by a switch that forwards the packet to controller 18. For example, controller 18 may use information such as switch ID and source port information of a packet in message 174 to help identify the source end host.

During step 186, controller 18 may identify source and destination domains from the source and destination end hosts. For example, controller 18 may maintain information that identifies which client switch and switch port each end host in the network is attached to (e.g., controller 18 may maintain network attachment point information for each known end host in the network). In this scenario, controller 18 may identify the network attachment point for the source and destination end hosts from the maintained information and identify corresponding domains based on the network attachment points. As an example, client domain CD1 may be identified for end host EH1 because end host EH1 is coupled to client switch SW1 that is included in client domain CD1. As another example, broadcast domain BD1 may be identified for end host EH4 because end host EH4 is coupled to port P2 of switch SW2, port P2 of switch SW1, port P2 of switch SW3, and port P2 of switch SW3 (e.g., ports that are associated with broadcast domain BD1).

During step 188, controller 18 may identify an inter-domain forwarding path between the source and destination domains (e.g., a forwarding path that includes domains such as client and non-client domains and controller-allowed links between the domains). As an example, the inter-domain forwarding path may include the source and destination domains and a list of intervening domains between the source and destination domains.

During step 190, controller 18 may determine intra-domain forwarding paths for each client domain in the inter-domain forwarding path. The intra-domain forwarding paths may be determined based on inter-domain forwarding maps (e.g., inter-domain forwarding maps that are stored for each client domain) and network topology information.

During step 192, controller 18 may control switches in the client domains to forward the packet from the source end host to the destination end host along the inter-domain forwarding path and along intra-domain forwarding paths that have been determined for each client domain in the inter-domain forwarding path. The process may then return to step 182 to process additional packets received from end hosts (e.g., packets associated with end hosts for which appropriate forwarding paths have not yet been provided to client switches).

Consider the scenario in which end host EH1 sends a network packet 172 to end host EH2. Client switch SW1 may receive network packet 172 from end host EH1 and attempt to match the network packet to existing flow table entries that have been provided to client switch SW1 by controller 18. In response to determining that network packet 172 does not match any existing flow table entries, client switch SW1 may forward the network packet to controller 18 as a packet in message 174. Controller 18 may receive network packet 172 and packet in message 174 (step 182) and identify end host EH2 as the destination end host based on information retrieved from the packet (step 184). Controller 18 may identify that source end host EH1 is associated with client domain CD1 and that destination end host EH2 is associated with client domain CD3 (step 186). Controller 18 may subsequently use network topology information such as network domain topology 110 of FIG. 9B to determine an inter-domain forwarding path between client domain CD1 and client domain CD3 (step 188). The inter-domain forwarding path may include domains CD1, BD1, CD2, BD2, and CD3. Controller 18 may then determine intra-domain forwarding paths for each client domain of the inter-domain forwarding path during step 190 (e.g., intra-domain forwarding paths may be determined for client domains CD1, CD2, and CD3 based on network topology information and inter-domain forwarding maps such as map 142 of FIG. 13). Controller 18 may subsequently control switches in client domains CD1, CD2, and CD3 to forward the network packet from end host EH1 to end host EH2 through domains CD1, BD1, CD2, BD2, and CD3 using the intra-domain forwarding paths.

Controller 18 may maintain information that identifies end hosts in the network using network attributes. Controller 18 may retrieve network attributes of an end host from network packets that are received from that end host. If desired, network attributes may be retrieved from packet in messages that include the network packets. The retrieved network attributes may be used to form a set of network attributes that describe the end host. As an example, an end host may be described by source addresses, a VLAN identifier, attachment point, or other network attributes retrieved from a packet in message (e.g., from a network packet or from information provided by a switch that describes the network packet). A set of retrieved network attributes that describes an end host may sometimes be referred to herein as an entity, packet entity, or device entity.

Figure 18:
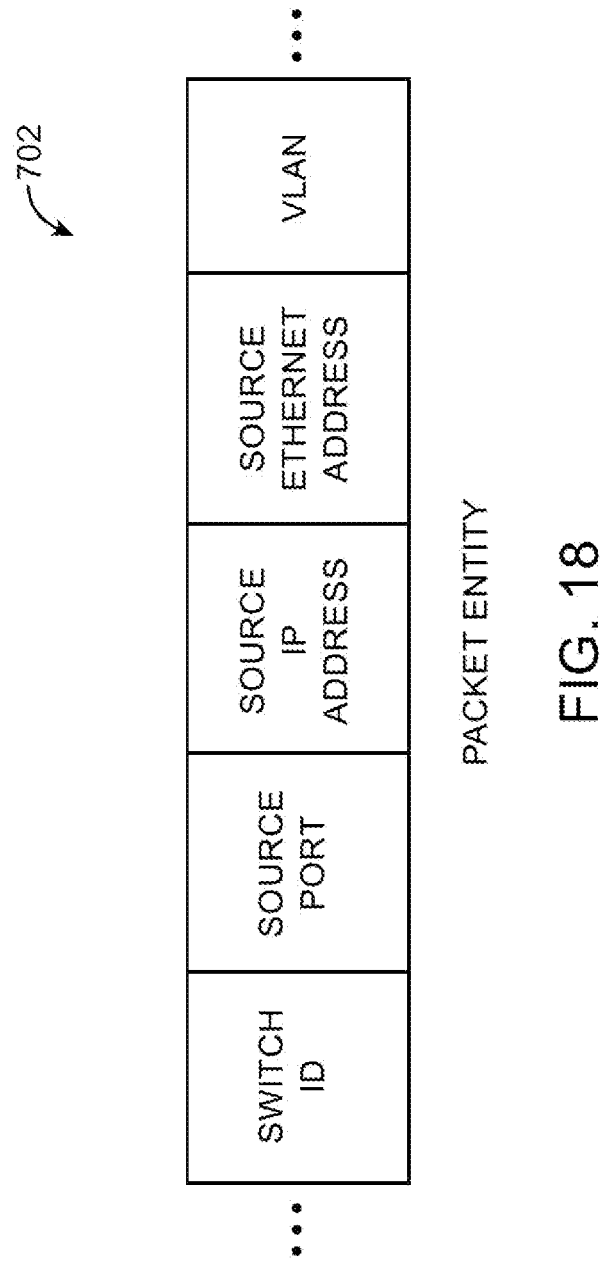
FIG. 18 is an illustrative packet entity that may be generated by a controller to represent an end host in accordance with an embodiment of the present invention.

FIG. 18 is a diagram of an illustrative packet entity 202. Packet entity 202 may include information that describes an end host. Packet entity 202 may include a switch ID, a source port, a source IP address, a source Ethernet address, and a VLAN identifier. If desired, packet entity 202 may include any combination of the network attributes of a network packet such as packet 172 or a packet in message such as message 174. Packet entity 202 may include additional network attributes that can be determined from a network packet received by a switch. For example, packet entity 202 may include network attributes associated with the extensible local area network (VXLAN) standard, the multiprotocol label switching (MPLS) standard, or network attributes retrieved from any desired packet header fields.

Packet entity 202 may be stored at controller 18 (e.g., at storage 102) or may be stored at remote computing equipment (e.g., remote storage that communicates with controller 18 over network paths or other communications paths). A database of packet entities 202 may be maintained by controller 18 at storage 102 (as an example). In this scenario, each entry of the database may include a packet entity 202 that describes a respective end host in the network.

Controller 18 may match network attributes of a packet received from an end host to network attributes of packet entities 202 to identify source and destination end hosts. For example, controller 18 may compare the source Ethernet address and VLAN identifier of a received packet 172 to the source Ethernet address and VLAN identifier of stored packet entities 202 to determine which stored packet entity matches the source end host of the received packet. As another example, controller 18 may compare the destination Ethernet address and VLAN identifier of a received packet 172 to the source Ethernet address and VLAN identifier of stored packet entities 202 to determine which packet entity matches the destination end host of the received packet.

In some scenarios, it may be difficult for controller 18 to accurately maintain packet entity information. Consider the scenario in which end host EH1 (FIG. 8) sends a network packet to end host EH2. In this scenario, the network packet may be forwarded through broadcast domain BD1 that includes non-client switches such as switch SW7. Non-client switch SW7 is not controlled by controller 18 and can potentially fail to determine appropriate forwarding paths to end host EH2 (e.g., because non-client switch SW7 may not know the location of end host EH2). Non-client switch SW7 may subsequently flood broadcast domain BD1, which causes the network packet to be received at port P2 of switch SW2, port P2 of switch SW3, and port P2 of switch SW4. Client switches SW2, SW3, and SW4 may forward the network packet to controller 18 as part of packet in messages. In response to receiving the packet in messages, controller 18 may be required to determine whether or not end host EH1 has relocated from switch SW1 to SW2, SW3, or SW4. In other words, controller 18 may determine whether the switch ID and source port (e.g., the attachment point) of a packet entity 202 corresponding to end host EH1 should be updated.

Figure 19:
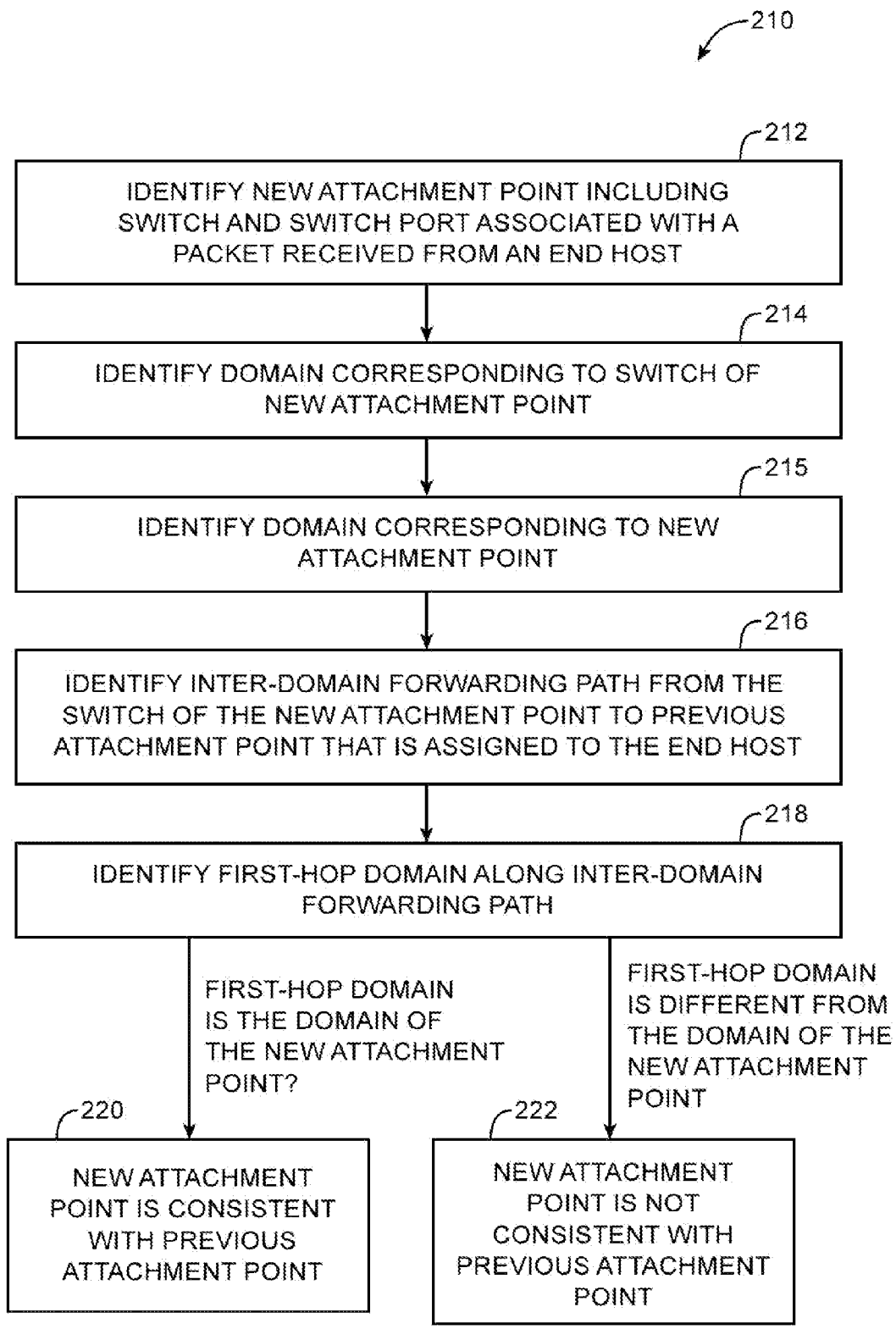
FIG. 19 is a flow chart of illustrative steps that may be performed to determine whether an end host is coupled to a network attachment point that is consistent with previously determined network attachment point information and network domain topology information in accordance with an embodiment of the present invention.

Controller 18 may determine whether the attachment point of a device (e.g., of a packet entity 202 associated with the device) should be updated based on network topology information. Controller 18 may use the network topology information to determine whether a new attachment point for a device is consistent with a previously determined attachment point for the device. FIG. 19 is a flow chart of illustrative steps that may be performed by controller 18 to determine whether a new attachment point is consistent with a previous attachment point and network topology information maintained by the controller.

During the operations of step 212, controller 18 may identify a new attachment point associated with a packet received from an end host. The new attachment point may be determined from information such as header fields retrieved from the packet or a packet in message that includes the packet. The new attachment point may include a switch and switch port (e.g., a port of a client switch that received the packet).

During step 214, controller 18 may identify which domain corresponds to the switch of the new attachment point. In other words, controller 18 may determine which domain the switch belongs to. As an example, controller 18 may identify that switch SW1 belongs to client domain CD1 based on network domain topology information (FIG. 9B). As another example, controller 18 may identify that switch SW3 belongs to client domain CD2.

During step 215, controller 18 may identify which domain corresponds to the new attachment point (e.g., which domain corresponds to the switch and switch port of the new attachment point). For example, controller 18 may identify that port P2 of client switch SW1 belongs to non-client domain BD1.

During step 216, controller 18 may identify an inter-domain forwarding path from the switch of the new attachment point to a previously determined attachment point that has already been assigned to the end host. The previous attachment point may be retrieved from a packet entity 202 that matches the packet received from the end host. For example, the source Ethernet address and VLAN identifier of the packet entity 202 may match the packet and the attachment point (e.g., switch ID and source port) may be retrieved from the packet entity. The inter-domain forwarding path may be determined based on network domain topology information maintained by controller 18. For example, similar operations to steps 186 and 188 of flow chart 180 (FIG. 17) may be performed to determine an inter-domain forwarding path from the switch of the new attachment point to the previous attachment point.

During step 218, controller 18 may identify the first domain along the inter-domain forwarding path from the switch of the new attachment point to the previous attachment point (e.g., the first domain following the domain of the new attachment point). The first domain along the inter-domain forwarding path may sometimes be referred to as the first-hop domain. If the first-hop domain is the same as the domain of the new attachment point (step 215), controller 18 may determine that the new attachment point is consistent with the previous attachment point and currently maintained network topology information. If the first-hop domain is different from the domain of the new attachment point, controller 18 may determine that the new attachment point is inconsistent with the previous attachment point and network topology information.

Consider the scenario in which controller 18 has previously determined that end host EH1 (FIG. 8) is coupled to the network attachment point consisting of port P3 of client switch SW1. In this scenario, consistent attachment points may include port P2 of switch SW3, port P2 of switch SW4, port P2 of switch SW5, and port P2 of switch SW6. For example, port P2 of switch SW3 may be consistent because the first-hop domain from switch SW3 to port P3 of switch SW1 may be broadcast domain BD1 and port P2 of switch SW3 belongs to broadcast domain BD1.

Figure 20:
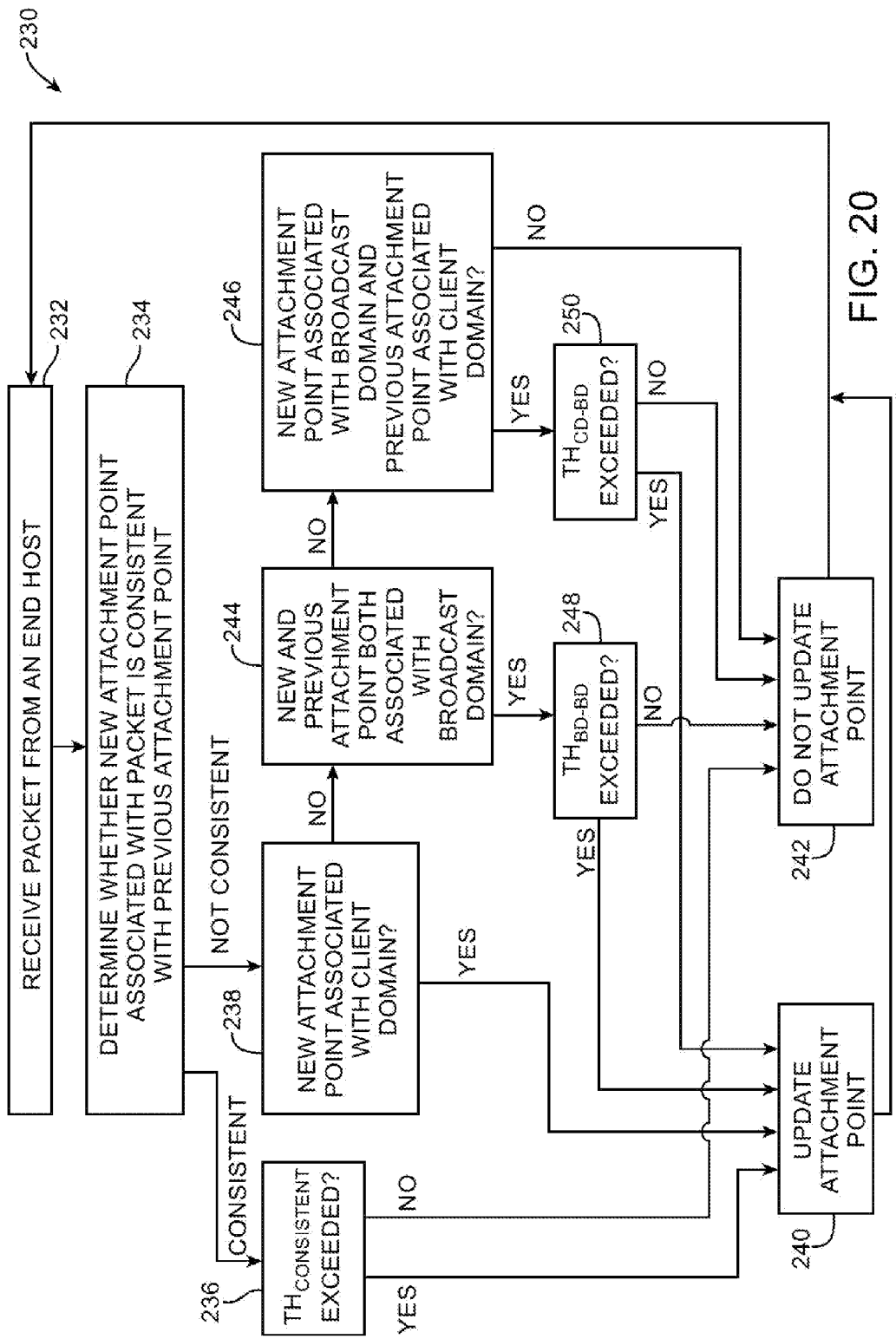
FIG. 20 is a flow chart of illustrative steps that may be performed to determine whether to update a network attachment point in accordance with an embodiment of the present invention.

Attachment points that are assigned to end hosts may be updated based on whether or not newly identified attachment points are consistent with previously determined attachment points of the end hosts. FIG. 20 is a flow chart 230 of illustrative steps that may be performed by controller 18 to update attachment points of end hosts.

During the operations of step 232, controller 18 may receive a packet from an end host (e.g., controller 18 may receive a packet or a packet in message including the packet).

During step 234, controller 18 may determine whether a new attachment point associated with the packet is consistent with a previously determined attachment point. For example, controller 18 may perform the steps of flowchart 210 (FIG. 19). In response to determining that the new attachment point is consistent with the previously determined attachment point, the operations of step 236 may be performed. In response to determining that the new attachment point is inconsistent with the previously determined attachment point, the operations of step 238 may be performed.

Controller 18 may maintain information that identifies when packets are received from end hosts and/or when attachment points are assigned to end hosts. The time at which a previous attachment point is assigned to an end host may be referred to herein as $T_{previous}$. The current time may be referred to as $T_{new}$.

During step 236, controller 18 may determine whether a time threshold $TH_{consistent}$ has been exceeded ($TH_{consistent} > |T_{new} - T_{previous}|$). Time threshold $TH_{consistent}$ may represent a maximum difference between the time at which the previous attachment point was determined and the time at which the packet was received. If the difference exceeds time threshold $TH_{consistent}$, controller 18 may update the attachment point assigned to the end host at step 240. If the difference does not exceed time threshold $TH_{consistent}$, controller 18 may maintain the previously determined attachment point for the end host at step 242. Use of threshold $TH_{consistent}$ may help to reduce errors in attachment point assignments in scenarios such as when a valid new attachment point appears to be consistent with a previously determined attachment point and a significant amount of time has passed since the assignment of the previous attachment point (e.g., time greater than threshold $TH_{consistent}$).

During step 238, controller 18 may determine whether the new attachment point is associated with a client domain. If the new attachment point is associated with a client domain, the controller may update the attachment point assigned to the end host at step 240 (e.g., because the end host has likely moved from the previous attachment point to the new attachment point). If the new attachment point is not associated with the client domain, the operations of step 244 may be performed.

During step 244, controller 18 may determine whether the new and previous attachment points are both associated with broadcast domains. If the new and previous attachment points are both associated with broadcast domains, the operations of step 248 may be performed. If the new and previous attachment points are not both associated with broadcast domains, the operations of step 246 may be performed.

During step 248, controller 18 may determine whether a threshold $TH_{BD-BD}$ is exceeded ($TH_{BD-BD} > |T_{new} - T_{previous}|$). If $TH_{BD-BD}$ is exceeded, controller 18 may update the attachment point assigned to the end host at step 240. If $TH_{BD-BD}$ is not exceeded, controller 18 may maintain the previously determined attachment point for the end host. By updating attachment point assignment only when threshold $TH_{BD-BD}$ is exceeded, controller 18 may help prevent undesirable updates. For example, non-client switches in broadcast domains may undesirably flood network packets even when the network packets are not designated as broadcast packets. In this scenario, use of $TH_{BD-BD}$ may help to reduce unnecessary attachment point assignments from network packets received from the broadcast domains at inconsistent attachment points after the assignment of a valid attachment point.

During step 246, controller 18 may determine whether the new attachment point belongs to a broadcast domain and whether the previous attachment point belongs to a client domain. In response to determining that the new attachment point belongs to a broadcast domain and that the previous attachment point belongs to a client domain, the operations of step 250 may be performed. Otherwise, the previously determined attachment point may be maintained at step 242.

A scenario in which the new attachment point is inconsistent with the previous attachment point, the new attachment point belongs to a broadcast domain, and the previous attachment point belongs to a client domain may indicate that an end host has moved. For example, consider the scenario in which end host EH1 moves from port P3 of switch SW1 to an attachment point in broadcast domain BD1 (e.g., a non-client domain). In this scenario, network packets sent from end host EH1 at the new attachment point may be received at port P2 of switch SW2, which is inconsistent with the previous attachment point associated with port P3 of switch SW1 (e.g., switch SW2 of the new attachment point and port P3 of switch SW1 both belong to client domain CD1 and no first-hop domain exists between client domain CD1 and itself).

During step 250, controller 18 may determine whether a threshold $TH_{CD-BD}$ is exceeded ($TH_{CD-BD} > |T_{new} - T_{previous}|$). The use of threshold $TH_{CD-BD}$ may help to reduce un excessive updating of attachment points in scenarios such as when non-client switches of broadcast domains undesirably flood the network with a packet. If threshold $TH_{CD-BD}$ is exceeded, the attachment point assigned to the end host may be updated at step 240. If threshold $TH_{CD-BD}$ is not exceeded, the previously determined attachment point may be maintained at step 242.

Thresholds $TH_{consistent}$, $TH_{BD-BD}$ and $TH_{CD-BD}$ may be provided by a user such as a network administrator or may be predetermined. Thresholds $TH_{consistent}$, $TH_{BD-BD}$, and $TH_{CD-BD}$ may be several microseconds to tens of seconds, or more. These examples are merely illustrative. Thresholds $TH_{consistent}$, $TH_{CD-BD}$, and $TH_{BD-BD}$ may be set to any desired length of time. If desired, thresholds $TH_{consistent}$, $TH_{CD-BD}$, and $TH_{BD-BD}$ may be set to the same values or may be removed entirely. For example, step 240 may be performed to update attachment points in response to determining that the new attachment point is inconsistent with the previous attachment point during step 234, whereas step 242 may be performed in response to determining that the new attachment point is consistent with the previous attachment point (e.g., steps 236, 238, 244, 246, and 250 may be omitted).

The example of FIG. 20 in which steps 238, 244, and 246 are performed sequentially is merely illustrative. If desired, steps 238, 244, and 246 may be performed in any desired order or may be performed in parallel. For example, step 246 may be performed before step 238 or step 244.

The foregoing is merely illustrative of the principles of this invention and various modifications can be made by those skilled in the art without departing from the scope and spirit of the invention.

The invention claimed is:

1. A method of using a controller that controls client switches in a network having non-client switches and end hosts that are coupled to the client and non-client switches, the method comprising:
   with the controller, forming client domains from groups of the client switches, wherein the client domains are separated by non-client domains formed from the non-client switches;
   with the controller, determining a network domain topology from the client domains and non-client domains;
   with the controller, receiving a network packet from a source end host that is destined for a destination end host;
   with the controller, identifying the source end host and destination end host from the received network packet;
   identifying a source domain that is associated with the source end host from the client and non-client domains;
   identifying a destination domain that is associated with the destination end host from the client and non-client domains;
   determining an inter-domain forwarding path from the source domain to the destination domain based on the network domain topology, wherein the inter-domain forwarding path includes the source domain, the destination domain, and a list of intervening domains between the source domain and the destination domain;
   for each client domain in the list of intervening domains, determining an intra-domain forwarding path from a previous domain to a subsequent domain in the list of domains; and
   controlling the client switches in each client domain of the inter-domain forwarding path to forward the network packet from the source end host to the destination host along the inter-domain forwarding path and the intra-domain forwarding path of each client domain of the inter-domain forwarding path.

2. The method defined in claim 1 further comprising:
   with the controller, determining a spanning tree from the client domains and the non-client domains based on the network domain topology.

3. The method defined in claim 2 further comprising:
   with the controller, controlling the client switches of the client domains to allow only network traffic between the client domains and the non-client domains along the spanning tree.

4. The method defined in claim 3 wherein controlling the client switches of the client domains to allow only network traffic between client domains and non-client domains along the spanning tree comprises:
   with the controller, providing flow table entries to the client switches that direct the client switches to drop network packets that do not traverse the spanning tree.

5. The method defined in claim 2, wherein the spanning tree comprises a loop free spanning tree.

6. The method defined in claim 5, wherein determining the spanning tree comprises generating the loop free spanning tree by removing network links identified by the network domain topology.

7. The method defined in claim 1 wherein the non-client domains are connected to ports of the client switches, the method further comprising:
   with the controller, generating an inter-domain forwarding map for each client domain based on the network domain topology, wherein the inter-domain forwarding map of each client domain identifies which port and which client switch of that client domain should be used to forward network packets from a given source network location to a neighboring domain.

8. The method defined in claim 7 wherein generating the inter-domain forwarding map based on the network domain topology comprises:
   selecting a given one of the client domains;
   selecting a client switch of the selected client domain; and
   determining intra-domain forwarding paths from the selected client switch throughout the selected client domain.

9. The method defined in claim 8 wherein determining intra-domain forwarding paths from the selected client switch throughout the selected client domain comprises:
   determining a client domain exit path from the selected client switch through the selected client domain to each non-client domain that is connected to the selected client domain in the network domain topology.

10. The method defined in claim 8 wherein generating the inter-domain forwarding map based on the network domain topology further comprises:
    determining a shortest path through the client domain between each pair of non-client domains that are connected to the selected client domain in the network domain topology.

11. The method defined in claim 7 wherein controlling the client switches in each client domain of the inter-domain forwarding path comprises:
    providing the client switches in each client domain of the inter-domain forwarding path with flow table entries that direct the client switches to forward the network packet from the source end host to the destination host along the inter-domain forwarding path and the intra-domain forwarding path of each client domain of the inter-domain forwarding path.

12. The method defined in claim 7 further comprising:
    with the controller, maintaining information identifying network attachment points of each of the end hosts that are coupled to the client and non-client switches, wherein identifying the source end host and destination end host from the received network packet comprises:

comparing network attachment point information determined from the received network packet to the maintained information identifying network attachment points of each of the end hosts that are coupled to the client and non-client switches.

13. The method defined in claim 1 wherein the non-client domains are connected to ports of the client switches, the method further comprising:

storing the network domain topology, wherein storing the network domain topology comprises storing information that identifies which client switches are assigned to each client domain and which ports of the client switches are assigned to each non-client domain.

14. The method defined in claim 1, further comprising:

with the controller, forming a plurality of client domains using the groups of the client switches, wherein each of the client domains in the plurality of client domains are separated by at least one non-client domain formed from the non-client switches.

15. The method defined in claim 1, wherein the non-client domains comprise non-client broadcast domains.

16. The method defined in claim 1, wherein the client domains are each separated by the non-client domains formed from the non-client switches without any direct network links between the client domains.

17. A method of using a controller that controls client switches in a network having non-client switches and end hosts that are coupled to the client and non-client switches, wherein groups of the client switches form respective client domains and wherein groups of the non-client switches form respective non-client domains that are interposed between the client domains, the method comprising:

with the controller, identifying a plurality of the client domains and a plurality of the non-client domains;

with the controller, receiving a network packet from a source end host;

with the controller, identifying a source domain associated with the network packet from the identified plurality of client domains and the identified plurality of non-client domains;

with the controller, identifying a destination domain associated with the network packet from the client and non-client domains;

determining an inter-domain forwarding path from the source domain to the destination domain, wherein the inter-domain forwarding path includes the source domain, the destination domain, and a list of intervening domains between the source domain and the destination domain;

for each client domain in the list of intervening domains, determining an intra-domain forwarding path from a previous domain to a subsequent domain in the list of domains; and controlling the client switches in each client domain of the inter-domain forwarding path to forward the network packet from the source end host to the destination host along the inter-domain forwarding path and the intra-domain forwarding path of each client domain of the inter-domain forwarding path.

18. The method defined in claim 17 further comprising:

with the controller, determining the inter-domain forwarding path from the source domain to the destination domain based on network topology information maintained by the controller.

19. The method defined in claim 17 further comprising:

with the controller, directing the client switches to forward the network packet from the source domain to the destination domain along the inter-domain forwarding path.

20. The method defined in claim 19 wherein directing the client switches to forward the network packet from the source domain to the destination domain along the inter-domain forwarding path comprises:

for each client domain in the inter-domain forwarding path, providing flow table entries to the client switches of that client domain that direct the client switches of that client domain to forward the network packet to a subsequent domain in the inter-domain forwarding path.

* * * * *